No. 638,083. Patented Nov. 28, 1899.
E. L. ANDERSON.
CHEMICAL GENERATOR OF ELECTRICITY.
(Application filed Oct. 4, 1898. Renewed Sept. 16, 1899.)
(No Model.)
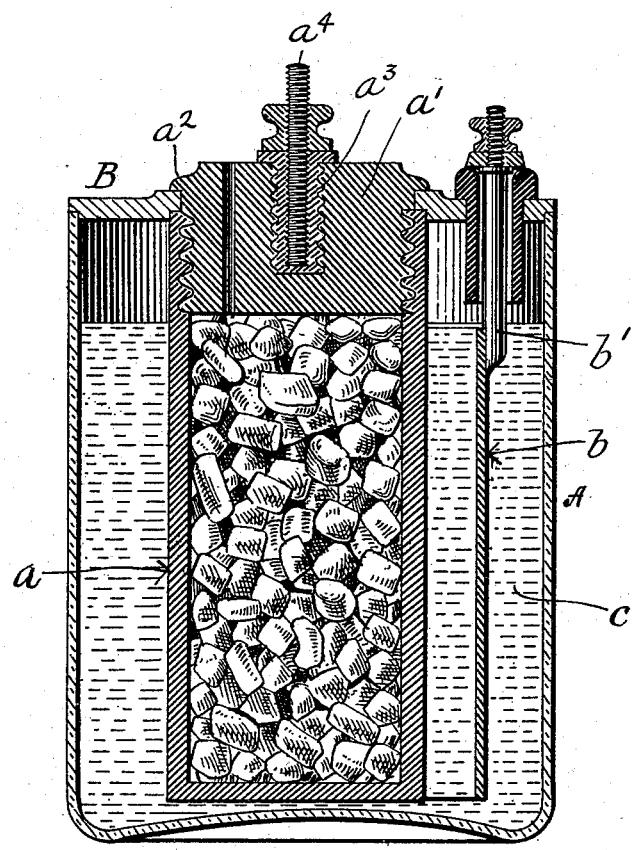
WITNESSES:
INVENTOR
Edward L. Anderson
BY
ATTORNEY

UNITED STATES PATENT OFFICE.

EDWARD LACEY ANDERSON, OF ST. LOUIS, MISSOURI.

CHEMICAL GENERATOR OF ELECTRICITY.

SPECIFICATION forming part of Letters Patent No. 638,083, dated November 28, 1899.

Application filed October 4, 1898. Renewed September 16, 1899. Serial No. 730,771. (No model.)

*To all whom it may concern:*

Be it known that I, EDWARD LACEY ANDERSON, a citizen of the United States, residing at St. Louis, in the State of Missouri, have invented certain new and useful Improvements in Chemical Generators of Electricity, of which the following is a full, clear, and exact description.

This invention relates to the chemical generation of electricity; and it consists in general of a battery in which are combined a solution having fluorin or hydrofluoric acid as a base, a pair of electrodes composed of materials occupying different positions in the electrical scale to produce a difference of potential, and a material for supplying oxygen to the cell.

The object of the invention is the production of a battery which will generate current for either open or closed circuit work at comparatively low cost and entailing but little care or attention.

The accompanying drawing illustrates in section one form of cell which may be used in carrying out my invention.

In the form of cell illustrated, A indicates the containing vessel, and B its cover.

$a$ is the negative electrode, consisting of a carbon cup having a cover $a'$ screw-threaded in place and supporting the cup by means of a flange $a^2$, resting upon the upper surface of the cover.

$a^3$ is a carbon plug screw-threaded into the cover $a'$ and having embedded in it a metallic post $a^4$, to which the line-wire is to be connected.

The positive electrode $b$ is an open cylinder of lead partly surrounding the carbon cup and having a lug $b'$ extending upward through the cover of the containing vessel, where it is fitted with proper devices for connecting the other terminal of the line-wire.

As above stated, the solution $c$ contains fluorin, or, more properly, hydrofluoric acid. The latter is obtained in its most concentrated commercial state and mixed with water in the proportion of one part acid to three parts water. To this solution I also prefer to add boracic acid, especially when a glass containing vessel is used, since the effect of the hydrofluoric acid on the glass is thereby neutralized. Enough boracic acid is used to saturate the hydrofluoric acid, about one part of boracic to two parts of the hydrofluoric solution, by weight, being the right proportion. When a containing vessel of material not attacked by the hydrofluoric acid is used, the boracic acid may be omitted; but in any case it is preferable to use the boracic acid, thus making the solution borohydrofluoric acid.

I also use in the cell or in connection with it some material or means capable of supplying oxygen—such as chromic acid, potassium permanganate, or atmospheric air—and introduce this into the solution direct or into the carbon cup, as indicated in the drawing.

I claim—

1. In a chemical generator of electricity, the combination of a pair of electrodes, one of which is lead, and a solution of hydrofluoric acid.

2. In a chemical generator of electricity, the combination of an electrode of lead, another of carbon, and a solution of hydrofluoric acid.

3. In a chemical generator of electricity, the combination of a pair of electrodes and a solution of borohydrofluoric acid.

4. In a chemical generator of electricity, the combination of a pair of electrodes, one of which is lead, a solution having fluorin as a base and a material capable of supplying oxygen thereto.

5. In a chemical generator of electricity, the combination of a lead electrode, a carbon electrode, a solution of hydrofluoric acid and means for supplying oxygen thereto.

6. In a chemical generator of electricity, the combination of a pair of electrodes, one of which is carbon and the other lead in some form, a solution of hydrofluoric acid and means for supplying oxygen to the cell, substantially as described.

7. In a chemical generator of electricity, the combination of a pair of electrodes one of which is carbon, and the other lead in some form, and a solution of hydrofluoric acid and a chemical capable of supplying oxygen to the cell.

In witness whereof I subscribe my signature in presence of two witnesses.

EDWARD LACEY ANDERSON.

Witnesses:
   S. G. BOOKER,
   M. HORAN.